(12) United States Patent
Bauer et al.

(10) Patent No.: US 8,746,012 B2
(45) Date of Patent: Jun. 10, 2014

(54) COMPOSITION AND METHOD OF MAKING A GLASS PRODUCT WITH REDUCED GREENHOUSE GAS EMISSION

(75) Inventors: Jon Frederick Bauer, Castle Rock, CO (US); Susan McMillin Gee, Littleton, CO (US)

(73) Assignee: Johns Manville, Denver, CO (US)

( * ) Notice: Subject to any disclaimer, the term of this patent is extended or adjusted under 35 U.S.C. 154(b) by 770 days.

(21) Appl. No.: 11/985,033

(22) Filed: Nov. 13, 2007

(65) Prior Publication Data

US 2009/0120132 A1    May 14, 2009

(51) Int. Cl.
*C03B 37/01* (2006.01)

(52) U.S. Cl.
USPC .................................. 65/376; 501/27; 501/36

(58) Field of Classification Search
USPC ............ 65/376, 66; 501/28, 36, 35, 154, 155, 501/49, 27, 31, 37, 73, 151
See application file for complete search history.

(56) References Cited

U.S. PATENT DOCUMENTS

| | | | | |
|---|---|---|---|---|
| 2,594,799 A | * | 4/1952 | Powell | 65/456 |
| 3,218,262 A | * | 11/1965 | De Lajarte | 252/625 |
| 3,945,816 A | * | 3/1976 | Johnson | 65/22 |
| 4,066,466 A | * | 1/1978 | Neely | 106/50 |
| 4,188,228 A | * | 2/1980 | Brzozowski | 501/29 |
| 4,199,336 A | * | 4/1980 | Rittler | 65/376 |
| 4,720,295 A | * | 1/1988 | Bronshtein | 65/474 |
| 4,764,487 A | * | 8/1988 | Lewis | 501/70 |
| 2001/0043996 A1 | * | 11/2001 | Yamada et al. | 428/34.4 |
| 2004/0204304 A1 | * | 10/2004 | Hockman | 501/27 |
| 2007/0220922 A1 | * | 9/2007 | Bauer et al. | 65/376 |

OTHER PUBLICATIONS

Table 1.3 Primary Energy Consumption by Source, 1949-2009 [online], US Department of Energy, retrived from: http://www.eia.doe.gov/emeu/aer/txt/ptb0103.html.*

Greenhouse Gases, Climate Change & Energy [online], US Department of Energy, retrieved from: http://www.eia.doe.gov/bookshelf/brochures/greenhouse/greenhouse.pdf.*

Aegina Glassworks [online], glass manufactuing furnace producer, retrieved from: http://aegina-glass.com/technology.htm.*

* cited by examiner

*Primary Examiner* — Richard Crispino
*Assistant Examiner* — Yana B Krinker
(74) *Attorney, Agent, or Firm* — Robert D. Touslee

(57) ABSTRACT

A process for making a glass product with reduced greenhouse gas emission, comprising: providing a raw material composition comprising at least one silicon dioxide or silicon dioxide-containing compound and at least one pre-reacted compound, wherein the pre-reacted compound comprises an atom of an alkaline earth metal chemically bonded to an oxygen atom, and a silicon atom chemically bonded to the oxygen atom; melting the raw material composition to produce a molten material; and forming the molten material into a glass product.

15 Claims, No Drawings

COMPOSITION AND METHOD OF MAKING A GLASS PRODUCT WITH REDUCED GREENHOUSE GAS EMISSION

BACKGROUND

A conventional process for manufacturing a glass product such as glass fibers includes the melting of various raw materials to form molten glass. Glass fibers can then be formed from the molten glass by conventional methods. Melting the conventional raw materials typically results in the release of significant quantities of certain gases such as greenhouse gases (GHGs) into the atmosphere. For example, substantial quantities of carbonate-based raw materials such as limestone and dolomite are typically used in conventional raw material compositions to facilitate processing of the material and to impart desirable characteristics to the glass product. The melting of such carbonate-based raw materials, however, typically results in the production of significant quantities of GHGs such as carbon dioxide.

The production of GHGs can also result from other processes commonly employed in a conventional glass fiber manufacturing process. Generation of electricity for providing energy used to melt the raw materials often involves a combustion reaction that produces GHGs. In addition, fiberization of molten glass can involve a combustion reaction that produces GHGs.

It can be advantageous to reduce emissions of greenhouse gases (GHGs) to the atmosphere. It can also be beneficial to improve the energy efficiency of a glass product manufacturing process.

SUMMARY

According to one aspect, a process for making a glass product with reduced greenhouse gas emission is provided, comprising: providing a raw material composition comprising at least one silicon dioxide or silicon dioxide-containing compound and at least one pre-reacted compound, wherein the pre-reacted compound comprises an atom of an alkaline earth metal chemically bonded to an oxygen atom, and a silicon atom chemically bonded to the oxygen atom; melting the raw material composition to produce a molten material; and forming the molten material into a glass product.

According to another aspect, a raw material composition for producing a glass product with reduced greenhouse gas emission is provided, comprising at least one silicon dioxide or silicon dioxide-containing compound and at least one pre-reacted compound, wherein the pre-reacted compound comprises an atom of an alkaline earth metal chemically bonded to an oxygen atom, and a silicon atom chemically bonded to the oxygen atom.

DETAILED DESCRIPTION

A raw material composition is provided for producing a glass product such as, for example, glass wool that is suitable for use as a building insulation material. As used herein, the term "glass product" refers to any product made of glass and can include, for example, glass fibers. The raw material composition can be melted, and the resulting molten material can be formed into the glass product.

The raw material composition includes a silicon dioxide or silicon dioxide-containing compound. The silicon dioxide or silicon dioxide-containing compound can be provided from any suitable source such as, for example, quartz, nepheline syenite, feldspar, feldspathic sand, aplite or a combination thereof. In an exemplary embodiment, quartz sand can be used as the silicon dioxide source.

The total amount of the silicon dioxide or silicon dioxide-containing compound present in the raw material composition can depend on various factors such as, for example, the specific silicon dioxide-containing compound(s) being used, the desired characteristics of the glass product, the process conditions being employed and/or the types of other materials present in the raw material composition. In exemplary embodiments, the silicon dioxide-containing compound can be present in an amount from about 2% to about 50%, based on the total weight of the raw material composition.

The raw material composition also includes at least one pre-reacted compound that comprises an atom of an alkaline earth metal chemically bonded to an oxygen atom, and a silicon atom chemically bonded to the oxygen atom. That is, in such pre-reacted compound, an atom of an alkaline earth metal and a silicon atom are bonded to the same oxygen atom. The alkaline earth metal can be, for example, calcium, magnesium, strontium, barium or a combination thereof. In an exemplary embodiment, calcium and magnesium are employed. The chemical bonds between the atoms can include covalent and/or ionic bonds.

The term "pre-reacted" refers to the fact that a reaction between the alkaline earth metal atom and the oxygen atom (e.g., an oxygen atom of a silicon dioxide) has already taken place in such compound. The pre-reacted compounds can be provided from various sources including naturally-occurring materials (e.g., materials resulting from geological processes) such as volcanic glass and a calcium silicate, and/or synthetic materials produced from industrial processes. Cements, cement dusts and/or cement clinkers can be used, wherein such materials can be, for example, calcium or calcium-aluminum silicates. By-products from metal processing can also be used, for example, calcium or calcium-aluminum silicate slags. In an exemplary embodiment, the at least one pre-reacted compound can be provided from a volcanic glass, a calcium silicate or a combination thereof.

The volcanic glass which contains the pre-reacted compound can include, for example, pumice, perlite, obsidian, pumicite, pitchstone or a combination thereof. In addition to the pre-reacted compound, the volcanic glass can contain various other constituents depending on the specific variety including oxides such as, for example, silicon dioxide, aluminum oxide and calcium oxide. An exemplary volcanic glass can include about 70% by weight silicon dioxide, about 13% by weight aluminum oxide, and 1% by weight calcium oxide. The amount of the volcanic glass present in the raw material composition can depend on, for example, the specific compound(s) being used, the desired characteristics of the glass product to be formed, the process conditions being employed and/or the types of other materials present in the raw material composition. In an exemplary embodiment, the volcanic glass can be present in an amount from about 5% to about 50%, based on the total weight of the raw material composition.

The calcium silicate can be provided from any suitable calcium silicate source such as, for example, wollastonite, a di-calcium silicate (such as larnite), a calcium silicate clinker or cement or a combination thereof. The amount of the calcium silicate present in the raw material composition can depend on, for example, the specific compound(s) being used, the desired characteristics of the glass product to be formed, the process conditions being employed and/or the types of other materials present in the raw material composition. In an exemplary embodiment, the calcium silicate can be present in an amount from about 1% to about 15%, based on the total weight of the raw material composition. When wollastonite is used, for example, it can be present in an amount from about 3% to about 15%, based on the total weight of the raw material composition.

In an exemplary embodiment, the total content of the volcanic glass and calcium silicate present in the raw material composition can be from about 5% to about 65%, based on the total weight of the raw material composition.

Conventional raw material compositions for forming a molten glass typically rely on the presence of substantial amounts of a carbonate-containing reactive agent such as soda ash ($Na_2CO_3$), dolomite ($CaMg(CO_3)_2$), burnt dolomite and/or limestone ($CaCO_3$) to assist in the glass forming process. Applicants have observed that the use of such substantial amounts of carbonate-containing reactive agents typically results in the production of a significant amount of GHGs such as carbon dioxide. Applicants have discovered that by employing a pre-reacted compound provided from a source such as calcium silicate and/or volcanic glass in the raw material composition, the amount of carbonate-containing reactive agents can be significantly reduced or substantially eliminated, thereby reducing GHG (e.g., carbon dioxide) emission during the processing of the raw material composition.

Use of such pre-reacted, non-carbonate-based raw materials such as volcanic glass and calcium silicate in the glass manufacturing process can result in reduced GHG emission, significant energy savings, faster melt rates and/or higher throughputs. The melting of a pre-reacted compound source such as calcium silicate and/or volcanic glass typically does not result in the substantial emission of GHGs (e.g., carbon dioxide). In addition, since calcium silicate and volcanic glass can function as additional sources of silicon dioxide, use thereof can reduce the amount of the source of silicon dioxide-containing compound used in the raw material composition.

By employing the at least one pre-reacted compound, the amount of carbonate-based raw material can be reduced or substantially eliminated from the raw material composition. In an exemplary embodiment, the total amount of carbonate-based raw material present in the raw material composition is about 25% or less, preferably from 0% to about 25%, more preferably from 0% to about 20% or less, based on the total weight of the raw material composition.

The raw material composition can also include a fluxing agent for facilitating the melting of the raw material composition by decreasing its melting point temperature. Suitable fluxing agents include, for example, borax or boric acid. The fluxing agent can optionally include soda ash, which is a carbonate-based material. The use of the aforementioned pre-reacted compound can reduce the amount of soda ash employed in the composition. The fluxing agent can be present in an amount effective to adjust the melting temperature of the raw material composition to an appropriate level such as, for example, from about 1000° C. to about 1600° C. For example, the fluxing agent can be present in an amount from about 15% to about 35% by weight, based on the total weight of the raw material composition. In an exemplary embodiment, about 10% to about 25% of a fluxing agent (e.g., which does not include soda ash) can be used in the composition.

The raw material composition can also include a magnesium-containing compound. Such magnesium-containing compound can be provided from any suitable source such as, for example, talc ($Mg_3Si_4O_{10}(OH)_2$), dolomite, burnt dolomite or a combination thereof. For example, the magnesium-containing compound can be present in an amount from 0% to about 10%, more particularly from about 4% to about 10%, based on the total weight of the raw material composition. In an exemplary embodiment, talc can constitute at least about 50% of the total amount of magnesium-containing compound present in the raw material composition, or alternatively at least about 75% of the total amount of magnesium-containing compound.

A conventional raw material composition typically employs dolomite or burnt dolomite as a magnesium source. Employing talc in the raw material composition in accordance with an exemplary aspect can reduce or eliminate the amount of dolomite or burnt dolomite present in such composition, which can in turn be effective to reduce GHG emissions during processing of the raw material composition.

The raw material composition can include a calcium-containing compound such as calcium fluoride ($CaF_2$). The calcium-containing compound can be provided from any suitable source such as, for example, fluorspar. For example, fluorspar can be employed in an amount from 0% to about 2%, based on the total weight of the raw material composition.

In an exemplary embodiment, cullet (i.e., recycled glass) can optionally be included in the raw material composition. The cullet can include, for example, bottle cullet, plate cullet or a combination thereof. The cullet can be present in an amount from 0% to about 60%, based on the total weight of the raw material composition.

The raw material composition can be present in any form suitable for being melted to form a molten material. For example, the various components of the raw material composition can be in the form of particles of sufficiently small size to facilitate the transport, processing and melting of the raw material composition. In an exemplary embodiment, the particle size of the particles can be about 500 μm or less. The average particle size of the particles can be from about 200 μm to about 500 μm. The components of the raw material composition can be mixed using any conventional means to increase the degree of intermingling of the components to promote the formation of a substantially homogeneous molten material during the melting process.

As will be understood by those skilled in the art, the amounts of the various constituents of the raw material composition can vary depending on various factors such as, for example, the desired final composition and characteristics of the glass product, the specific process conditions being employed and the presence of other raw materials. Thus, the amounts of, for example, volcanic glass and calcium silicate present in the raw material composition can be calculated from the desired amounts of the constituents of the glass product. An exemplary glass wool composition suitable for use in the manufacture of an insulation product, is shown in the following Table 1:

TABLE 1

Exemplary Glass Wool Composition

| Material | Amount (by weight percent) |
|---|---|
| $SiO_2$ | 58.6 |
| $Al_2O_3$ | 5.2 |
| $B_2O_3$ | 8.0 |
| CaO | 8.6 |
| MgO | 2.6 |
| $Na_2O$ | 15.4 |
| $K_2O$ | 1.0 |
| $F_2$ | 1.0 |

A method of making a glass product with reduced GHG emission is also provided. The method can include providing a raw material composition as described above, melting the raw material composition to form a molten material and forming the molten material into a glass product. For example, the raw material composition can be introduced into a furnace in which heat is applied to the composition. The molten material can be, for example, substantially homogeneous to enable the formation of a glass product with consistent characteristics. The temperature at which the raw material composition is melted can depend on the specific composition employed, and can be from about 1000° C. to about 1600° C. Any glass product capable of being formed from the molten material can be made including, for example, glass fibers and glass wool suitable for use as an insulation material.

Any conventional processes and techniques for forming glass fibers from a molten glass material can be used. For example, the molten material can be introduced to heated bushings or spinnerets having a plurality of fine orifices. The molten glass can be extruded through such orifices to form glass strands or fibers. Other conventional processes of forming glass fibers include continuous drawing, flame attenuation and blowing techniques. In a continuous drawing process, the molten material can be fed through orifices in heated bushings to form fine filaments. A high-speed winder can catch multiple strands of the fine filaments while revolving at a rate much faster than the flow rate of the molten glass from the bushings. The high-speed winder can exert tension on the fine filaments extruding them into even thinner filaments. Flame attenuation refers to a process of forming glass fibers wherein molten glass exits a furnace under the force of gravity to form filaments. These filaments can then pass by a flame, such as a high-velocity gas burner flame, which causes them to lengthen and decrease in diameter. Examples of blowing techniques to produce glass fibers are centrifugal blowing and die blowing. Centrifugal blowing refers to a method of making glass fibers wherein molten glass passes through apertures of a rapidly rotating spinner. The glass can then be attenuated by contact with blasts of hot gases, such as steam or combustion gases.

EXAMPLES

Glass samples are prepared having the exemplary glass wool composition set forth in Table 1 from the raw material compositions (Examples A to F) listed in the following Table 2. The total GHG emissions resulting from the melting of each raw material composition is listed in Table 2.

TABLE 2

Compositions and GHG Emissions of Examples A to F

| | Raw Material Composition (by weight percent) | | | | | |
|---|---|---|---|---|---|---|
| Raw material | Ex. A | Ex. B | Ex. C | Ex. D | Ex. E | Ex. F |
| Quartz sand (silica) | 21.5 | 14.7 | 22.9 | 29.7 | 0 | 4.2 |
| Nepheline syenite | 10.0 | 0 | 0 | 10.0 | 13.7 | 0 |
| Borax (5 moles H$_2$O) | 14.7 | 14.7 | 14.7 | 14.7 | 15.4 | 15.0 |
| Soda ash | 14.4 | 14.5 | 14.5 | 14.5 | 4.3 | 10.0 |
| Burnt dolomite | 0 | 0 | 5.5 | 5.6 | 0 | 0 |
| Limestone | 0 | 0 | 0 | 0 | 0 | 0 |
| Fluorspar | 1.9 | 1.9 | 1.9 | 1.9 | 2.0 | 1.9 |
| Volcanic glass | 17.3 | 34.2 | 34.1 | 17.2 | 6.1 | 34.4 |
| Wollastonite | 13.5 | 13.3 | 6.3 | 6.5 | 2.8 | 9.8 |
| Talc | 6.6 | 6.6 | 0 | 0 | 5.7 | 4.6 |
| Bottle cullet | 0 | 0 | 0 | 0 | 50.0 | 0 |
| Plate cullet | 0 | 0 | 0 | 0 | 0 | 20.0 |
| Total GHG emission (lbs. per ton raw material comp.) | 119.8 | 120.4 | 173.7 | 173.3 | 25.6 | 82.7 |

A comparative glass wool product is prepared having the exemplary glass wool composition set forth in Table 1, using the comparative raw material composition listed in Table 3 (Comparative Example G). The GHG emission due to each constituent of the comparative example, in particular, the soda ash, burnt dolomite and limestone, is shown in Table 3. The total GHG emission due to the melting of Comparative Example G is 218 lbs. per ton of raw material composition.

TABLE 3

Composition and GHG Emission of Comparative Example G

| Raw material | Raw Material Amount (by weight percent) | GHG emission (lbs. per ton raw material comp.) |
|---|---|---|
| Quartz sand (silica) | 39.2 | 0 |
| Nepheline syenite | 19.6 | 0 |
| Borax (5 moles H$_2$O) | 14.4 | 0 |
| Soda ash | 14.1 | 117 |
| Burnt dolomite | 5.5 | 53 |
| Limestone | 5.4 | 48 |
| Fluorspar | 1.8 | 0 |
| Total | 100 | 218 |

As can be seen from Tables 2 and 3, each of Examples A to F exhibit lower total GHG emission compared with Comparative Example G. The total GHG emission of Examples A to F were compared with the total GHG emission of Comparative Example G, and the percentage of GHG emission reduction is set forth in the following Table 4:

TABLE 4

GHG Emission Reduction

| Example | GHG emission reduction (compared with Comparative Example G) |
|---|---|
| A | 44.7% |
| B | 44.5% |
| C | 19.9% |
| D | 20.1% |
| E | 83.6% |
| F | 61.8% |

As can be seen from the above table, employing the exemplary raw material compositions can lead to the reduction of GHG emissions. For a single glass plant producing 100,000 tons of glass wool per year, utilizing the raw material compositions of Examples A to F can result in the reduction of GHG emissions by approximately 3,000 to 12,000 tons per year. The raw material compositions of Examples A to F also require less energy to melt, which can in turn provide energy cost savings and further reduce GHG emissions at the power plant. Table 5 provides melting enthalpies for Examples A to F and Comparative Example G. Table 5 also provides the percentage reduction in energy usage for melting Examples A to F based on the energy used for melting Comparative Example G.

TABLE 5

Melting Heat and Energy Savings of Examples A to F

| Composition | Heat required to melt comp. at 1500° C. (kJ per kg glass) | Energy savings (as a percentage of Heat required of Comp. Example G) |
| --- | --- | --- |
| A | 2527 | 12.8 |
| B | 2474 | 14.7 |
| C | 2375 | 18.1 |
| D | 2405 | 17.1 |
| E | 2378 | 18.0 |
| F | 2413 | 16.8 |
| G (comparative) | 2900 | n/a |

Using a standard rate of 1.341 lbs. of $CO_2$ produced per kwh of electricity used in melting and a melt energy requirement of 900 kwh per ton of glass produced, the energy savings provided in Table 5 converts to an additional reduction of 7,000 to 11,000 tons of $CO_2$ per year at the power plant. In total, it is possible to reduce GHG emissions by up to about 23,000 ton per year per 100,000 tons glass produced.

We claim:

1. A process for making a glass product with reduced greenhouse gas emission, comprising:
   providing a raw material composition comprising at least one silicon dioxide or silicon dioxide-containing compound and at least one pre-reacted compound, wherein the pre-reacted compound comprises a calcium silicate in combination with a volcanic glass, and a total content of the volcanic glass and the calcium silicate present in raw material composition is from about 5% to about 65%, based on the total weight of the raw material composition, and wherein the raw material composition has no added calcium carbonate;
   melting the raw material composition to produce a molten material; and
   forming the molten material into a glass product, wherein the process reduces greenhouse gas emissions by about 20% to about 84% as compared to a process that uses a raw material composition that includes about 5 wt. % limestone.

2. The process of claim 1, wherein the raw material composition comprises quartz, nepheline syenite, feldspar, feldspathic sand, aplite or a combination thereof, as a source of the at least one silicon dioxide or silicon dioxide-containing compound.

3. The process of claim 1, wherein the silicon dioxide or silicon dioxide-containing compound is present in an amount from about 2% to about 50%, based on the total weight of the raw material composition.

4. The process of claim 1, wherein the raw material composition comprises pumice, perlite, obsidian, pumicite, pitchstone or a combination thereof.

5. The process of claim 1, wherein the raw material composition comprises wollastonite.

6. The process of claim 1, wherein the raw material composition further comprises talc.

7. The process of claim 6, wherein the talc is present in an amount of about 4% to about 10%, based on the total weight of the raw material composition.

8. The process of claim 1, wherein the raw material composition further comprises fluorspar.

9. The process of claim 1, wherein the raw material composition further comprises glass cullet.

10. The process of claim 1, wherein the raw material composition further comprises a fluxing agent selected from borax, boric acid or a combination thereof.

11. The process of claim 10, wherein the fluxing agent comprises about 15% by weight percent of the raw material composition.

12. The process of claim 1, wherein in the raw material composition, the total content of carbonate-containing compounds is 0% to 25%, based on the total weight of the raw material composition.

13. The process of claim 1, wherein the glass product formed in the process is a plurality of glass fibers.

14. The process of claim 1, wherein the raw material composition is melted at a temperature of from about 1000° C. to about 1600° C.

15. The process of claim 1, wherein the total pounds of green-house gas emission produced by the process per ton of raw material composition is between 25.6 and 173.7.

* * * * *